United States Patent
Kifuku et al.

(10) Patent No.: US 7,106,017 B2
(45) Date of Patent: Sep. 12, 2006

(54) MOTOR CONTROL DEVICE

(75) Inventors: Takayuki Kifuku, Tokyo (JP); Masaki Matsushita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/883,391

(22) Filed: Jun. 19, 2001

(65) Prior Publication Data

US 2002/0109474 A1    Aug. 15, 2002

(30) Foreign Application Priority Data

Feb. 14, 2001   (JP) .............................. 2001-036923

(51) Int. Cl.
*H02O 7/00*   (2006.01)

(52) U.S. Cl. ...................... 318/434; 318/432; 318/138; 318/254; 318/439; 318/700

(58) Field of Classification Search ........ 318/430–434, 318/700–800, 439, 809, 811, 801, 805, 138, 318/254

See application file for complete search history.

(56) References Cited

U.S. PATENT DOCUMENTS

| | | | | |
|---|---|---|---|---|
| 5,023,538 A | * | 6/1991 | Mutoh et al. | 318/811 |
| 5,467,001 A | * | 11/1995 | Iwashita | 318/434 |
| 5,504,404 A | * | 4/1996 | Tamaki et al. | 318/432 |
| 5,777,447 A | * | 7/1998 | Okano | 318/434 |
| 6,194,856 B1 | * | 2/2001 | Kobayashi et al. | 318/432 |
| 6,992,448 B1 | * | 1/2006 | Fujimoto et al. | 318/254 |

FOREIGN PATENT DOCUMENTS

| | | | |
|---|---|---|---|
| EP | 0 550 426 A1 | | 7/1993 |
| EP | 0 903 279 A2 | | 3/1999 |
| EP | 1 057 715 A2 | | 12/2000 |
| JP | 59-122381 | | 7/1984 |
| JP | 62-239822 | | 10/1987 |
| JP | 1-186468 | | 7/1989 |
| JP | 06-225573 | * | 8/1994 |
| JP | 7-31189 | | 1/1995 |
| JP | 08-066091 | * | 3/1996 |
| JP | 09-215388 | | 8/1997 |
| JP | 2000-0078744 | | 3/2000 |
| JP | 2000-217367 | * | 8/2000 |
| JP | 2000-253689 | * | 9/2000 |
| JP | 2001-008499 | * | 1/2001 |
| JP | 2002-034289 | * | 1/2002 |
| WO | WO 00/48047 A1 | | 8/2000 |

OTHER PUBLICATIONS

Japanese Abstract, JP-1-186468, Jul. 26, 1989.
Japanese Abstract, JP-7-31189, Jan. 31, 1995.

* cited by examiner

*Primary Examiner*—Lincoln Donovan
*Assistant Examiner*—Tyrone Smith
(74) *Attorney, Agent, or Firm*—Sughrue Mion, PLLC

(57) ABSTRACT

A motor control device for a multiple-phase motor includes a drive circuit (PWM inverter) which drives the multiple-phase motor (three-phase DC brushless motor), and a microcontroller that controls the drive circuit, wherein the microcontroller limits a motor current in accordance with an integrated value of a predetermined function of a phase current.

20 Claims, 8 Drawing Sheets

TIME
MOTOR ROTATION TIME

TIME
MOTOR SERVO LOCK TIME

MOTOR CONTROL DEVICE

This application is based on Application No. 2001-36923, filed in Japan on Feb. 14, 2001, the contents of which are hereby incorporated by reference.

BACKGROUND OF THE INVENTION

1. Field of the Invention

The present invention relates to a control device for a DC brushless motor or the like, and, in particular, to an over-heat protection of the motor.

2. Description of the Related Art

Conventionally, there has been an over-heat protecting device for an AC servo motor disclosed in, for example, Japanese Patent Unexamined Publication No. Sho 62-239822. In this conventional device, when it is judged that a motor is servo-locked, the electrification of the motor is interrupted so that the motor is protected from being over-heated in accordance with a predetermined characteristic corresponding to a stop position.

The above-described conventional device is applicable to a case where there arises no problem even if the electrification of the motor is interrupted at the time of over-heating. However, if the above-described conventional device is applied to a motor control device that does not allow a rapid change in torque, such as an electric power steering device, there arises a problem in that a steering feeling is rapidly changed at the time of performing the over-heat protection.

SUMMARY OF THE INVENTION

The present invention has been made to solve the above-described problem, and therefore an object of the present invention is to provide a motor control device which is capable of performing over-heat protection while smoothly changing a motor output characteristic with passage of time.

Bearing the above object in mind, according to the present invention, there is provided a motor control device for a multi-phase motor, comprising: a drive circuit for driving the multi-phase motor; and a micro-controller for controlling the drive circuit; wherein the micro-controller limits a motor current in accordance with an integrated value of a predetermined function of a phase current.

In a preferred form of the present invention, the micro-controller limits a peak value of the phase current in accordance with an integrated value of a predetermined function of a phase current.

In another preferred form of the present invention, the micro-controller limits the motor current in accordance with a maximum value of the given functional integrated values of the respective phase currents.

In a further preferred form of the present invention, the micro-controller limits a d-axial current in accordance with an integrated value of a predetermined function of a phase current.

In a yet further preferred form of the present invention, the micro-controller limits a q-axial current in accordance with an integrated value of a predetermined function of a phase current.

In a still further preferred form of the present invention, the micro-controller limits a current obtained by vector-synthesizing a d-axial current and a q-axial current in accordance with an integrated value of a predetermined function of a phase current.

In a still further preferred form of the present invention, the micro-controller does not change a phase angle formed by the q-axis and the current obtained by vector-synthesizing the d-axial current and the q-axial current before and after the motor current is limited.

In a yet still further preferred form of the present invention, the micro-controller changes the phase angle formed by the q-axis and the current obtained by vector-synthesizing the d-axial current and the q-axial current before and after the motor current is limited.

In another preferred form of the present invention, after the motor current is current obtained by vector-synthesizing the d-axial current and the q-axial current so as to allow the d-axial current to flow in priority as compared with the state in which the motor current is not limited yet.

In a further preferred form of the present invention, after the motor current is limited, the micro-controller changes the phase angle formed by the q-axis and the current obtained by vector-synthesizing the d-axial current and the q-axial current so as to allow the q-axial current to flow in priority as compared with the state in which the motor current is not limited yet.

In a yet further preferred form of the present invention, the micro-controller limits the motor current in accordance with an integrated value of a power function of the phase current.

In a still further preferred form of the present invention, the micro-controller limits the motor current in accordance with the integrated value of a deviation between the phase current and a predetermined threshold value.

In a yet still further preferred form of the present invention, the micro-controller limits the motor current in accordance with the integrated value of a deviation between the power function of the phase current and a predetermined threshold value.

In another preferred form of the present invention, the micro-controller limits the motor current in accordance with an integrated value of the power function of a deviation between the phase current and a predetermined threshold value.

In a further preferred form of the present invention, the micro-controller calculates the power function through polynomial approximation.

In a yet further preferred form of the present invention, the micro-controller calculates the power function with reference to a table.

In a still further preferred form of the present invention, the micro-controller independently conducts the calculation in accordance with the phase current flowing direction.

In a yet still further preferred form of the present invention, the micro-controller conducts the calculation in accordance with an absolute value of the phase current.

In a yet further preferred form of the present invention, the micro-controller conducts the calculation in accordance with a detected value of the phase current.

In a still further preferred form of the present invention, the micro-controller conducts the calculation in accordance with a target value of the phase current.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

These and other objects and advantages of this invention will become more apparent from the following detailed description taken with the accompanying drawings in which.

DETAILED DESCRIPTION OF THE PREFERRED EMBODIMENTS

A detailed description will now be given in more detail of preferred embodiments of the present invention with reference to the accompanying drawings.

Embodiment 1

Figure 1:
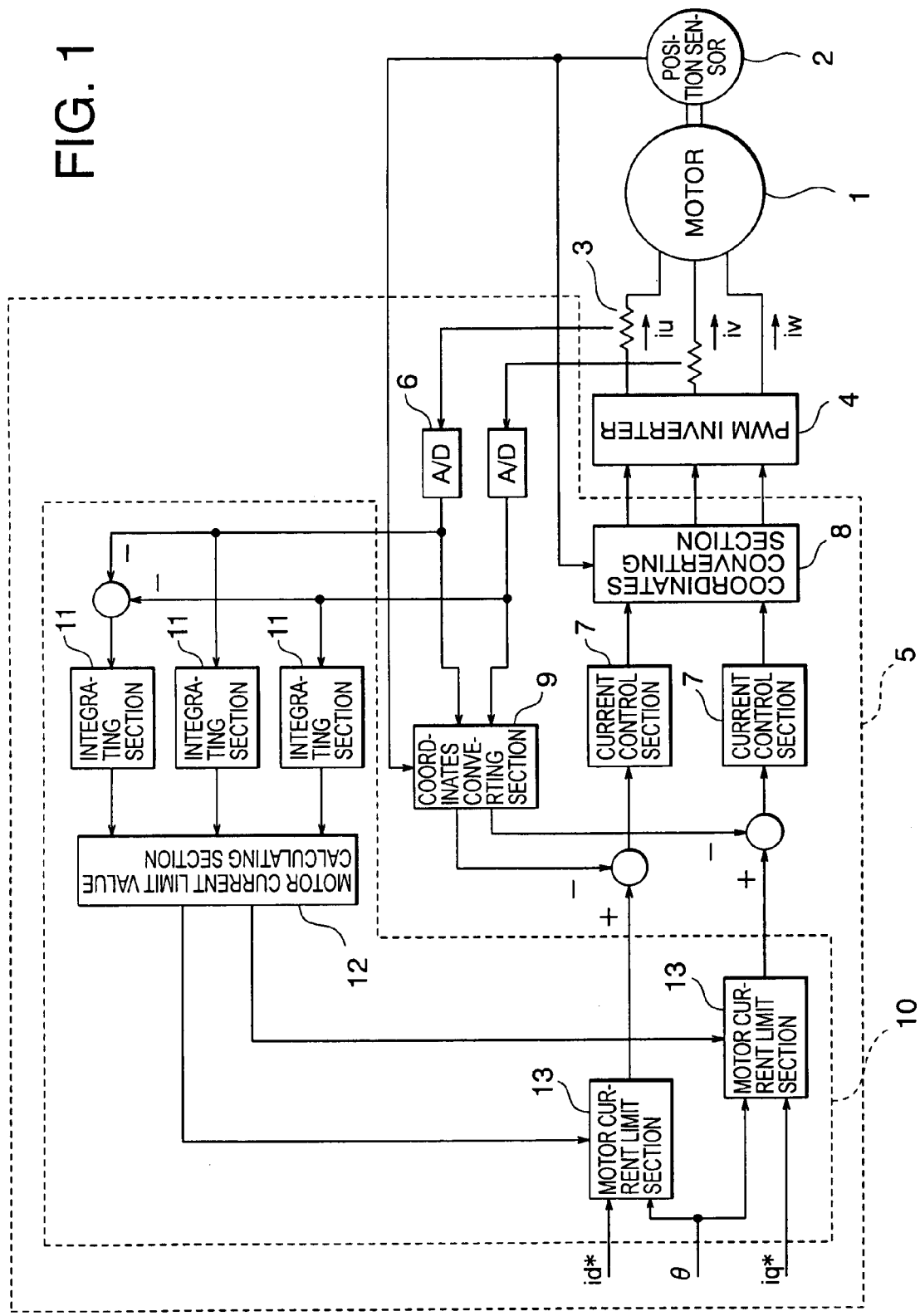
FIG. 1 is a block diagram showing the structure of a motor control device in accordance with a first embodiment of the present invention.

FIG. 1 is a block diagram showing the structure of a motor control device in accordance with a first embodiment of the present invention. Referring to FIG. 1, reference numeral 1 indicates a three-phase DC brushless motor, numeral 2 indicates a position sensor for detecting the magnetic pole position of a rotor of the three-phase DC brushless motor 1, numeral 3 indicates a current detecting circuit for detecting the phase current of the three-phase DC brushless motor 1, and numeral 4 indicates a PWM inverter that serves as a driver circuit for driving the three-phase DC brushless motor.

Reference numeral 5 indicates a the micro-controller that controls the PWM inverter 4, and the micro-controller 5 is equipped with an A/D converting section 6 for converting the phase current to a digital value, as well as the following structural elements 7 to 13 which are realized as software. That is, as the structural elements realized as the software, reference numeral 7 indicates a current control section that feedback-controls the motor current on d-q coordinates, numeral 8 indicates a coordinates converting section that converts an output of the current control section 7 from the d-q coordinates to the three-phase AC coordinates, numeral 9 indicates a coordinates converting section that converts the detected value of the phase current by the current detecting circuit 3 from the three-phase AC coordinates to the d-q coordinates.

Further, reference numeral 10 indicates an over-heat protecting section that protects the entire motor control device and the PWM inverter 4 from being over-heated, and provides the following structural elements. That is, as the structural elements of the over-heat protecting section 10, reference numeral 11 indicates an integrating section that adds the phase currents for a predetermined period of time in a predetermined period so as to obtain the time average of the phase current, numeral 12 indicates a motor current limit value calculating section that calculates the limit value of the motor current on the basis of the time average value of the phase current, and numeral 13 indicates a motor current limiting section for limiting the d-axial current and the q-axial current to a predetermined maximum current value or less according to the motor current limit value calculating section 12.

Figure 2:
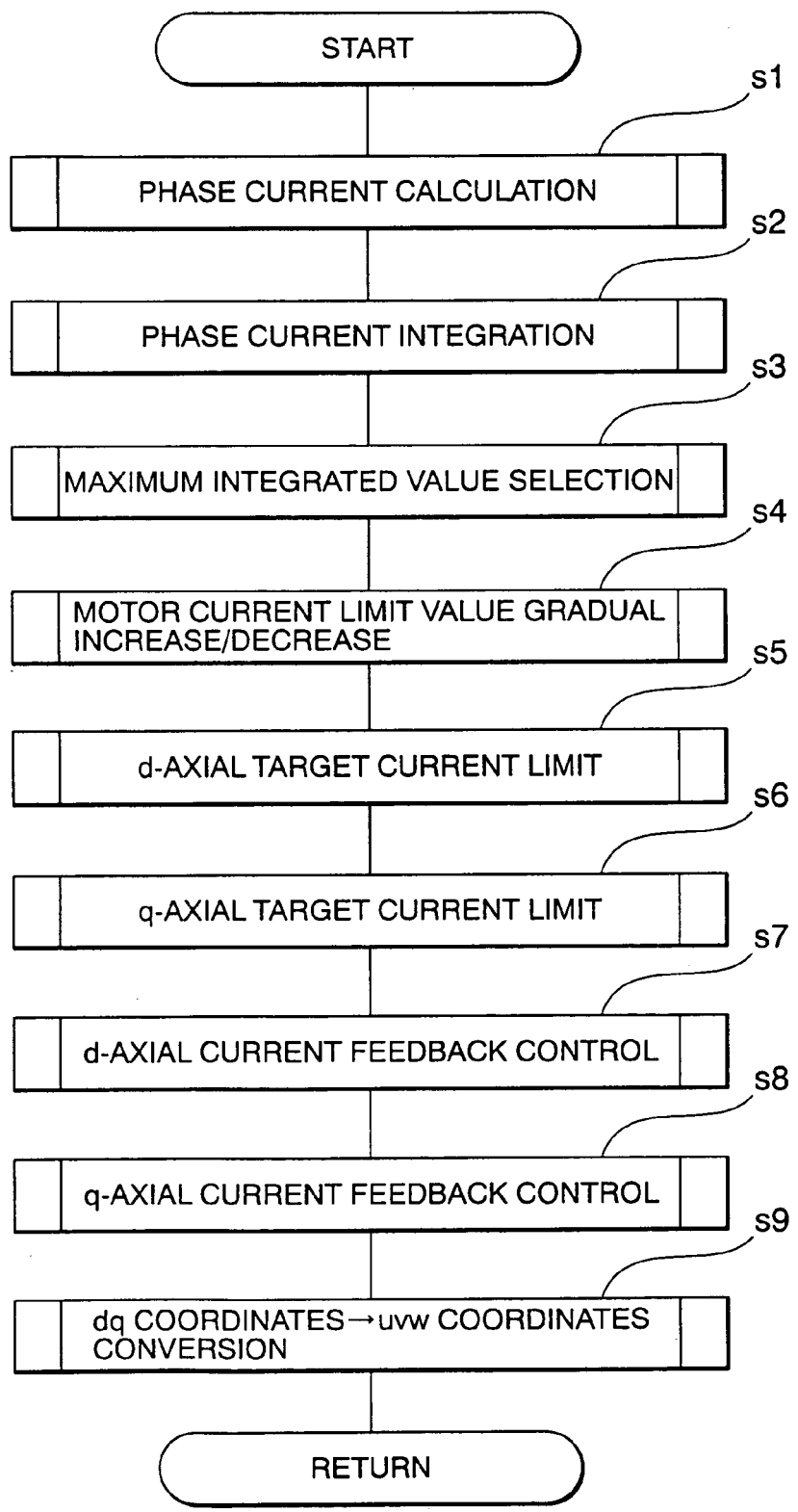
FIG. 2 is a flowchart for aiming the operation of a program installed in a micro-controller in accordance with the first embodiment of the present invention.

FIG. 2 is a flowchart for explaining the operation of a program installed in the micro-controller 5.

Subsequently, the operation will be described. To phases consisting of a U-phase current and a V-phase current among the respective phase currents of the motor 1 are converted into predetermined voltages by the current detecting circuit 3 and then inputted to the micro-controller 5. The respective inputted phase currents are discretized by the A/D converting section 6 and then subjected to software processing.

Then, the operation of the program installed in the micro-controller 5 will be described with reference to the flowchart shown in FIG. 2. It is assumed that the present program is called in a predetermined constant period. Also, it is assumed that a d-axial target current id* and a q-axial target current id* are given separately.

First, in Step s1, three-phase currents are obtained through conversion on the basis of the following expression.

$$iw = -iu - iv$$

where iu is a u-phase current (detected by the current detecting circuit 3), iv is a v-phase current (detected by the current detecting circuit 3) and iw is a w-phase current (calculated on the basis of a detected value of the current detecting circuit 3).

Then, in Step s2, the respective phase currents are added for a predetermined period of time in a predetermined period so as to obtain time average values. This processing corresponds to the integrating section 11 in FIG. 1.

Figure 3:
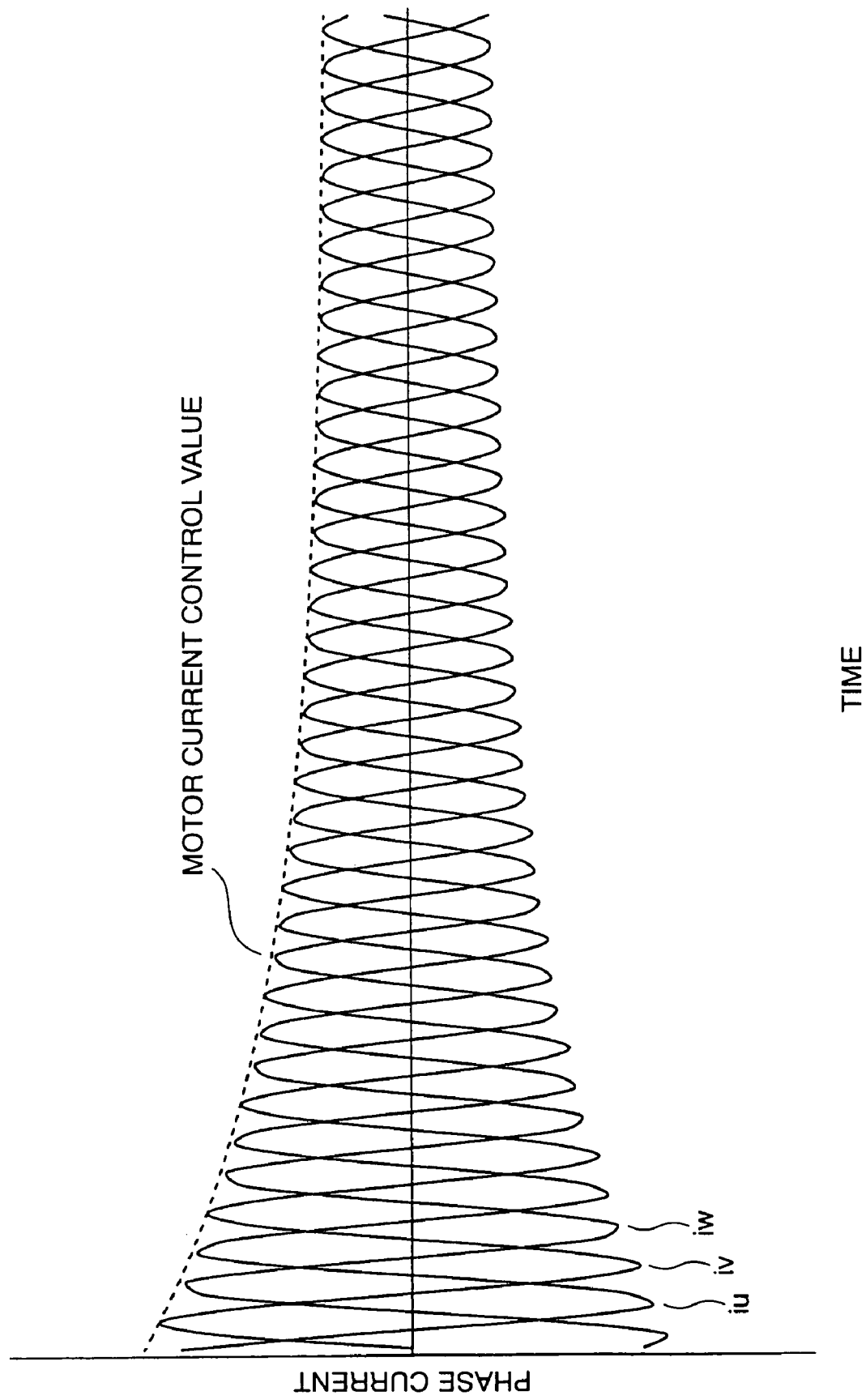
FIG. 3 is a graph showing a motor current gradual increase/decrease

The respective phase currents are sine waves as shown in FIG. 3, and if the respective phase currents are added for one period as they are, they become 0. Therefore, the phase currents are added for each of positive and negative according to the current flowing directions. Assuming that the respective phase currents in the positive direction are represented by iu+, iv+, and iw+, and that the respective phase currents in the negative direction are represented by iu−, iv−, and iw−, the following 6 different integrated values are obtained.

$$\Sigma iu+, \Sigma iv+, \Sigma iw+, \Sigma iu-, \Sigma iv-, \Sigma iw-$$

Figure 4:
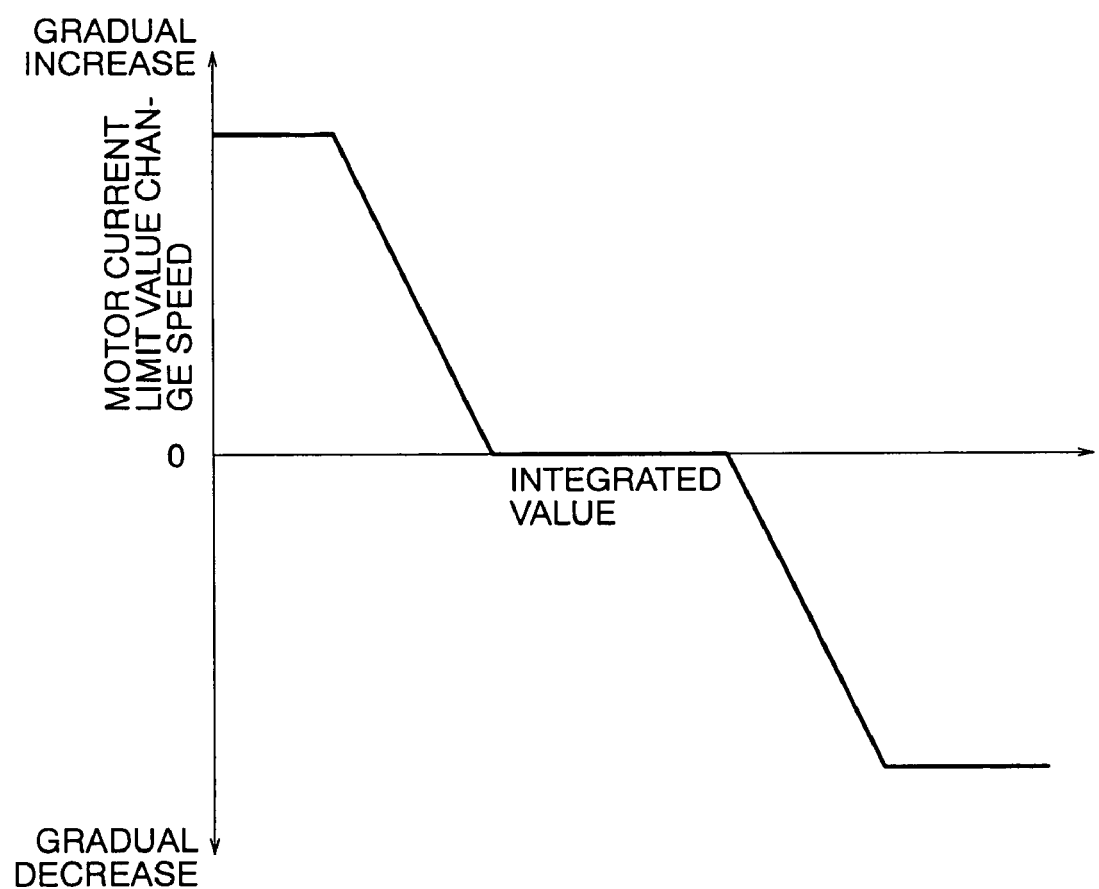
FIG. 4 is a graph showing a motor current waveform in accordance with the first embodiment of the present invention.

Subsequently, in step s3, the maximum value is selected from integrated values of the above respective phase currents, and in step s4, the allowable maximum currents of the respective phase currents are gradually decreased or increased, for example, on the basis of the characteristic shown in FIG. 4, in accordance with the selected maximum value, to thereby calculate the motor current limit value. The steps s3 and s4 correspond to the motor current limit value calculating section 12.

Figure 5:
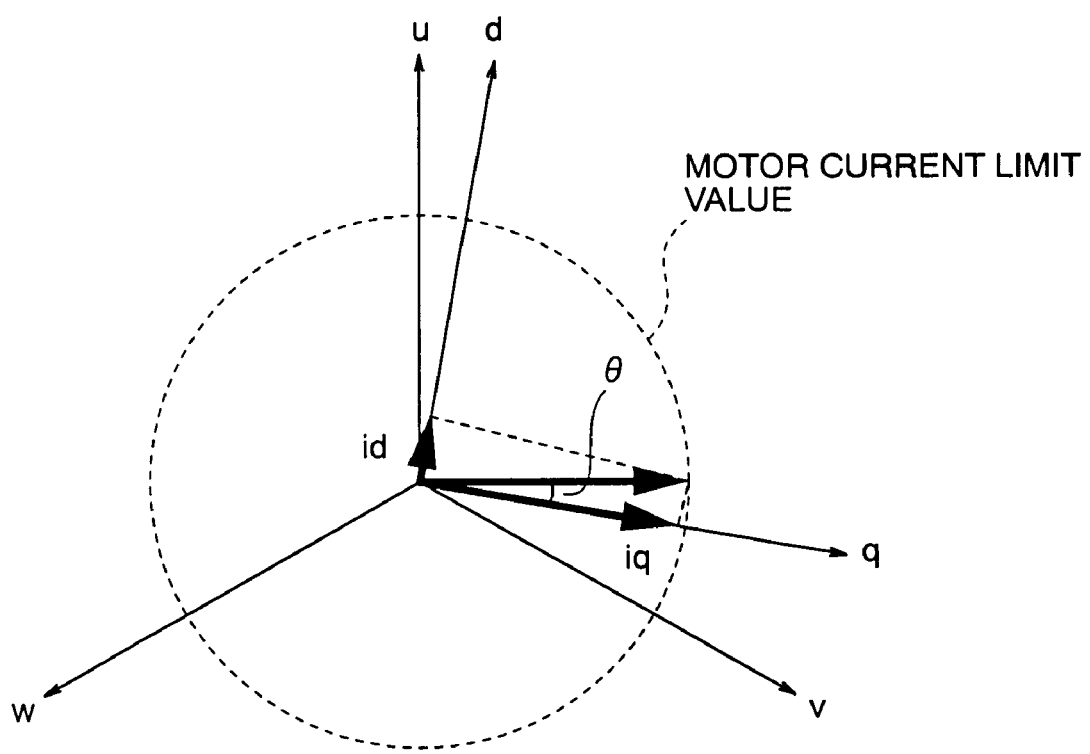
FIG. 5 is an explanatory diagram of a current limit value in accordance with the first embodiment of the present invention.

FIG. 5 shows an example of the current limit operation in accordance with this processing. The motor current is limited on the basis of the maximum value of the integrated values of the respective phase currents, to thereby protect a phase which is most heated without losing a balance of the three phases of the motor current. Also, the motor current limit value by the motor current limit value calculating section 12 limits the peak value of the motor current and gradually decreases or increases without distortion of the sine wave motor current.

In addition, the d-axial target current id* is limited in step s5 and the q-axial target current iq* is limited in step s6, on the basis of the above-mentioned motor current limit value so as to limit the motor current under the motor current control on the d-q coordinates. The steps s5 and s6 correspond to the motor current limit section 13 in FIG. 1.

Now, the current limiting method on the d-q coordinates will be described in more detail with reference to FIG. 5.

As described above, the motor current limit value obtained by the motor current limit value calculating section 12 limits the peak value of the sine wave motor current, and when the motor current limit value is drawn on a vector diagram, it can be represented by a circle constant in radius on the three-phase AC coordinates as indicated by a broken line in FIG. 5. This limits a vector synthetic value of the d-axial current and the q-axial current (hereinafter referred to as "synthetic vector current") on the d-q coordinates.

Therefore, in the motor current limit section 13, the d-axial component of the motor current limit value given by the motor current limit means 12 is obtained as the d-axial current limit value, and the q-axial component is obtained as the q-axial current limit value, respectively, in accordance with a phase angle θ (hereinafter referred to as "current phase angle") formed by the q-axis and the synthetic vector current which is given separately. The d-axial target current id* and the q-axial target current iq* are limited to the respective limit values or less thus obtained, to thereby achieve the current limit on the d-q axis.

As described above, the d-axial target current and the q-axial target current which are limited to the predetermined values or less are compared with the respective detected currents of the d-axis and the q-axis which are coordinates-converted from the detected values of the phase currents in steps s7 to s8, and then feedback-controlled by algorithm such as PI control that corresponds to the current control section 7 in FIG. 1.

Finally, in step s9, the operating amounts of the respective current control sections are converted into the three-phase AC coordinates and then given to the PWM inverter 4. This corresponds to the coordinates conversion 8 in FIG. 1.

The PWM inverter 4 PWM-drives the motor 1.

As described above, according to the first embodiment, the motor current on the d-q coordinates are smoothly limited with time, and appropriate over-heat protection can be performed without rapidly changing the motor output torque.

Figure 6A:
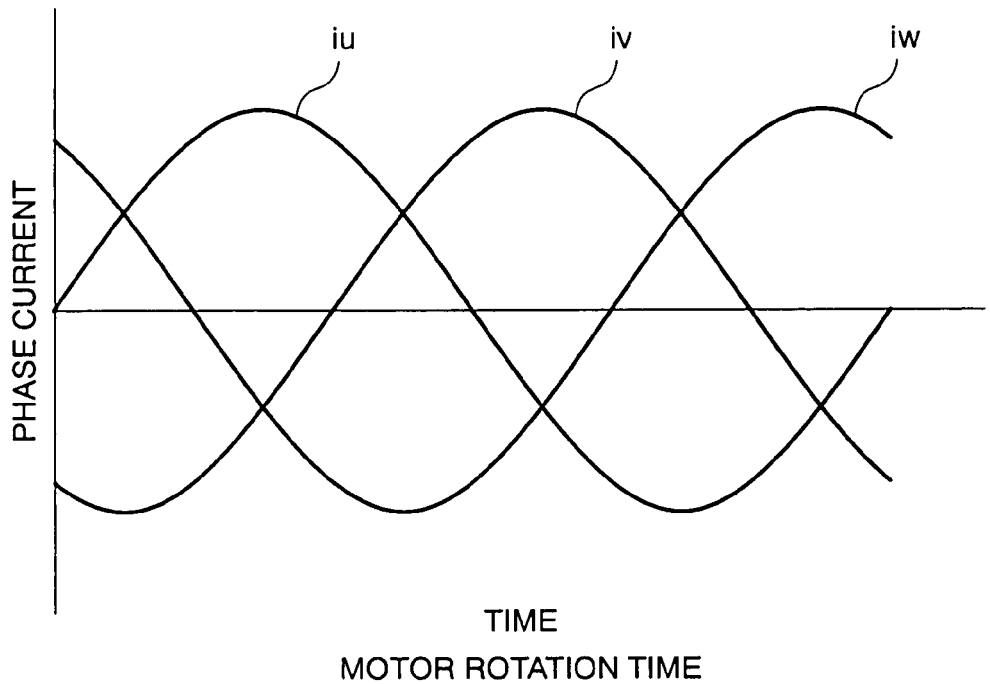
FIGS. 6A and 6B are diagrams showing current waveforms at the ti me of motor rotation and at the time of servo lock, respectively.
Figure 6B:
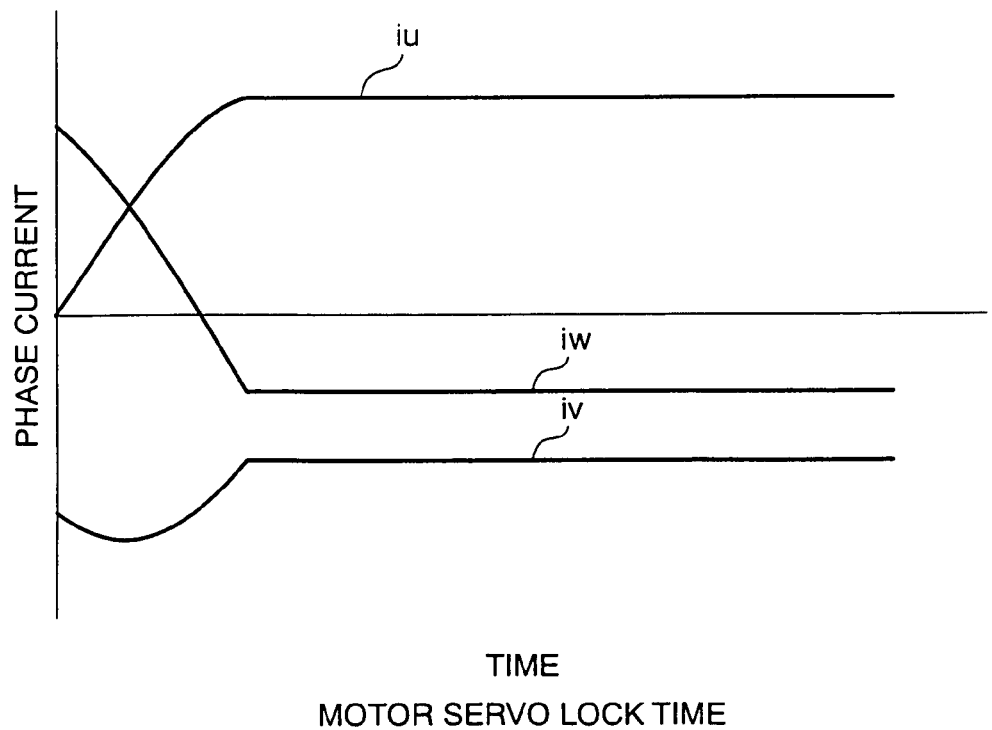

Also, as shown in FIG. 6, the time average value of the phase current at the motor servo lock time increases as compared with the motor rotating time (see FIG. 6A). Therefore, the motor current is quickly limited during the servo lock time as compared with the motor rotating time, whereby a very practical over-heat protection can be realized.

The first embodiment is of a system in which the respective phase currents are integrated by the integrating section 11 (the time average value of the phase currents is obtained) to limit the motor current. Alternatively, the power functions of the phase currents may be integrated. The loss of the motor 1 or the PWM M inverter 4 is substantially proportional to the current or the square of the current, whereby more appropriate over-heat protection can be performed.

As the power function of the phase current, there are the following functions.

$f1\ (i) = i^{1.5}$ $f2\ (i) = i^2$ $f3\ (i) = i^{1.5} + a$ where f1, f2 and f3 are the power functions of the phase currents, i is a motor current and a is an arbitrary constant.

In this situation, if the power functions are subjected to polynomial approximation, the calculating amount can be further reduced, whereby it is possible to reduce the load of the micro-controller 5. Also, if the calculation is made with reference to a table, the calculating amount can be still further reduced. If the power multiplier of the power function is 1, the motor current is limited on the basis of the average value of the phase current with a time as in the first embodiment shown in FIG. 1, and the first embodiment shown in FIG. 1 is equivalent to system which limits the motor current on the basis of the integrated value of the power functions of the phase currents whose power multiplier is 1.

Also, in the first embodiment, the respective phase currents are added for each of positive and negative separately, but the absolute values of the respective phase currents may be added. In the PWM inverter 4, an element of high heat generation is different depending on the phase current directions, but the copper loss of the motor 1 is kept constant regardless of the phase current directions. Consequently, the calculating amount can be reduced within the sufficiently practical range of use, and the load of the micro-controller 5 can be reduced.

Further, while the first embodiment consists of a system in which the detected values of the respective phase currents are integrated, the target values of the respective phase currents may be integrated. In this case, the first embodiment can also be applied to a motor control device not having a phase current detecting circuit such as open loop control.

Also, while in the first embodiment, the motor 1 is formed of a three-phase DC brushless motor, the over-heat protection can be performed in the same manner as long as the motor 1 is a multiple-phase motor such as an induction electric motor.

Further, while in the first embodiment, no description is given about the current phase angle θ since the current phase angle is given separately, the current phase angle may be changed or not changed before and after the motor current is limited.

Where changing the current phase angle θ, there are two methods: a method in which the d-axial current is allowed to flow in priority while the synthetic vector current is limited to a predetermined value or less, and a method in which the q-axial current is allowed to flow in priority. In the case where the DC brushless motor is to be controlled as in the first embodiment, a weak field effect is obtained if the d-axial current flows in the negative direction. Consequently, if the d-axial current is allowed to flow in priority, driving can be performed such that priority is given to the rotating speed. Also, if the field is constant, the q-axial current is proportional to an output torque, and therefore if the q-axial current is allowed to flow in priority, the driving can be performed such that priority is given to the torque.

In the case where the current phase angle θ is not changed, the motor current can be limited while gradually reducing the rotating speed and the output torque with in a well-balanced manner.

Also, the above method is applicable to a case where the magnetic flux is controlled by the excitation current as in the induction electric motor. There has been described a method of controlling the DC brushless motor on the d-q coordinates, as regards a change in the above current phase angle θ. Similarly, the current is gradually reduced in the case where the induction electric motor is controlled in the orthogonal coordinates system.

Embodiment 2

Wherein the above-described first embodiment current feedback control is conducted on the d-q coordinates. The present invention can also be applied to a system in which the AC current directly fed back. In this case the calculating amount can be further reduced.

Figure 7:
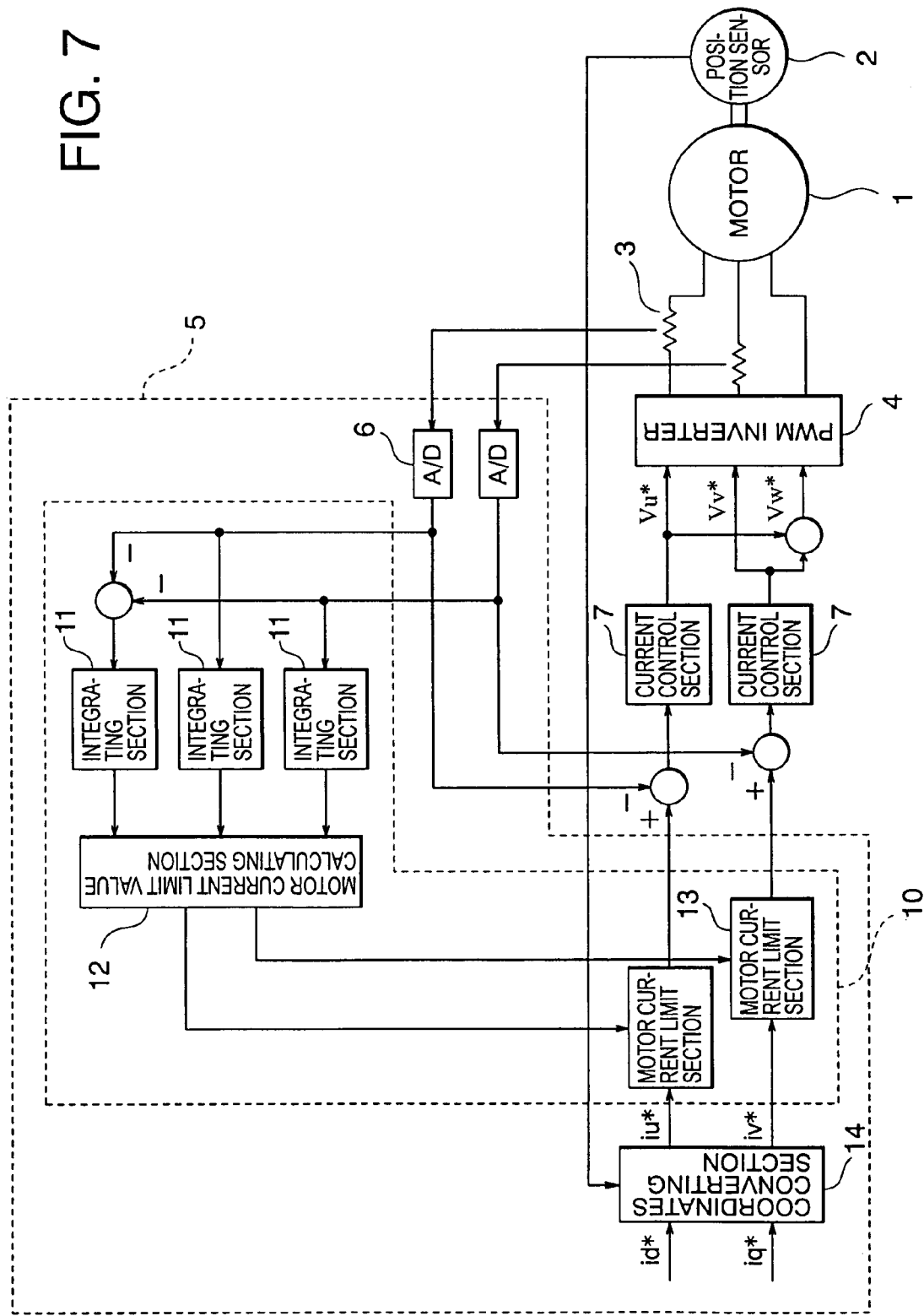
FIG. 7 is a block diagram showing the structure of a motor control device in accordance with a second embodiment of the present invention.

FIG. 7 is a block diagram showing the structure of a motor control device in accordance with a second embodiment of the present invention. Referring to FIG. 7, the parts which are the same as those in the first embodiment shown in FIG. 1 are indicated by the same reference numerals, and their description will be omitted. As a new reference numeral, numeral 14 indicates a coordinates converting section that converts a target current on the d-q coordinates to a target current on the three-phase AC coordinate. The coordinates converting section 14 is equipped in the micro-controller 5 as a structural element which is realized as software as in the first embodiment. Because the program installed in the micro-controller 5 can be realized by the same structure as that of the first embodiment, the flowchart of the program will be omitted.

Next, the operation will be described. The phase current detected by the A/D converting section 6 is integrated in the integrating section 11, and the limit values of the peak values of the respective phase currents are calculated by the motor current limit value calculating section 12 as described in the first embodiment.

The d-axial target current id* and the q-axial target current iq* are converted into the target currents iu* and iv* on the three-phase AC coordinates by the coordinates converting section 14.

As described in the first embodiment, the motor current limit value by the motor current limit value calculating section 12 limits the peak value of the three-phase AC current. Therefore, the desired currents iu* and iv* on the three-phase AC coordinates which are coordinates-converted by the coordinates converting section 14 are compared directly with the above-mentioned motor current limit value and can be limited to predetermined values or less. Therefore, the peak values of the target currents iu* and iv* on the three-phase AC coordinates are limited to the motor current limit value or less which is calculated by the motor current limit value calculating section 12, by the motor current limit section 13.

The respective desired currents on the three-phase a.c. coordinates whose peak values are limited are compared with the detected currents of the respective phases, and then feedback-controlled in accordance with the algorithm such as P control by the current control section 7. The operating amounts of the respective current control sections are given to the PWM inverter 4, and the PWM inverter 4 PWM-drives the motor 1. One of the three phase voltages $v_w^*$ of the three-phase AC that is given to the PWM inverter 4 is obtained from the other two phase voltages $v_u^*$, $v_v^*$.

Accordingly, in accordance with the second embodiment, the peak values of the respective phase currents on the three-phase AC coordinates are smoothly limited, and appropriate over-heat protection can be performed without involving a raped change in the torque.

Embodiment 3

While in the above-described first and second embodiments, the maximum current is limited on the basis of the time average value of the phase current, the maximum value may also be gradually reduced on the basis of a predetermined threshold value and the deviation of the phase current. In this case, the motor current can be limited so as to be quick if the current is large and slow if the current is small, thereby being capable of performing more practical over-heat protection.

Figure 8:
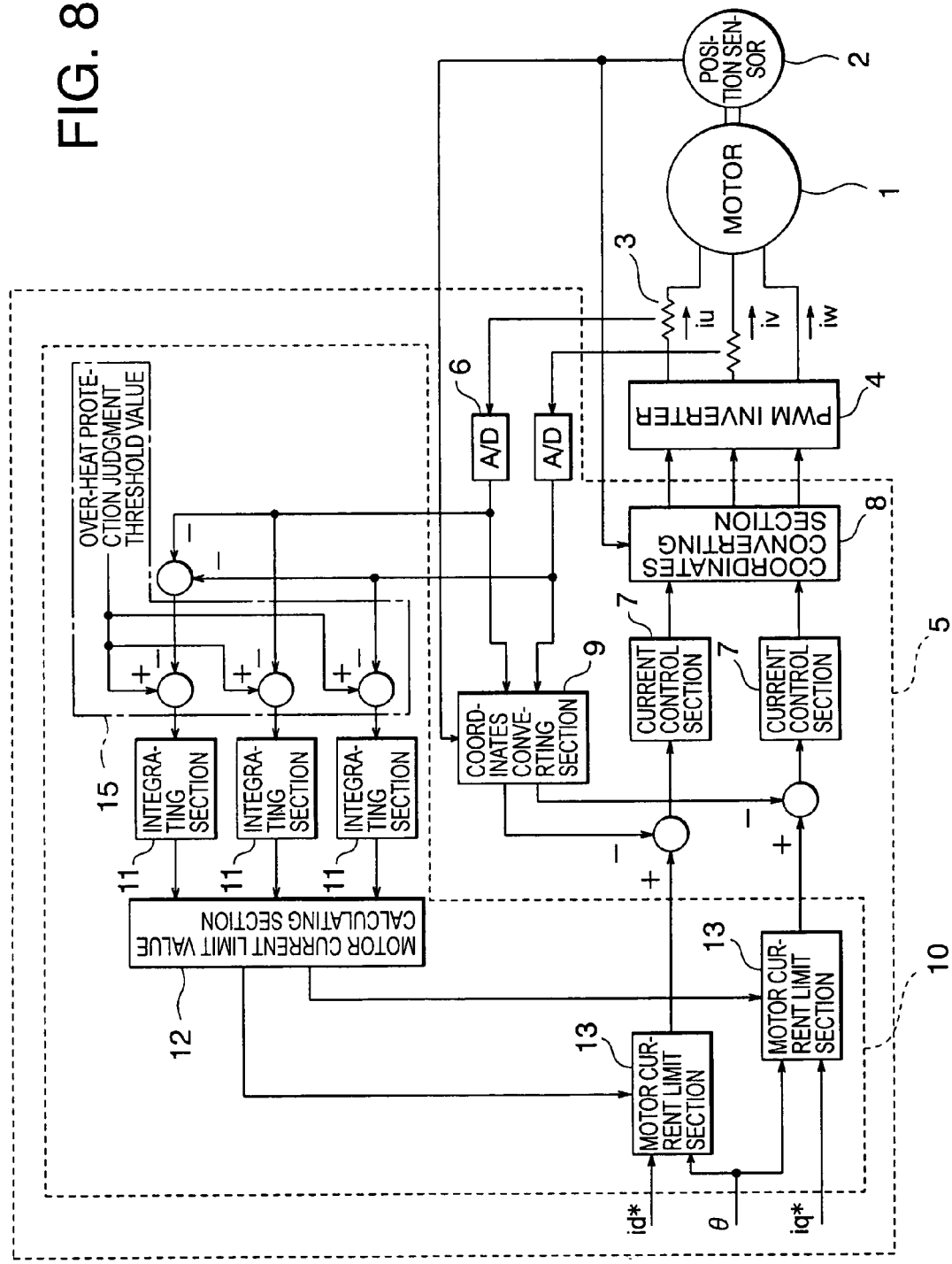
FIG. 8 is a block diagram showing the structure of a motor control device in accordance with a third embodiment of the present invention.

FIG. 8 is a block diagram showing the structure of the motor control device in accordance with a third embodiment of the present invention. Referring to FIG. 8, the same parts as those in the first and second embodiments shown in FIGS. 1 and 7 are indicated by the same reference numerals, and their description will be omitted. As a new reference numeral, numeral 15 indicates a deviation calculating section that calculates a deviation between the phase current and the a predetermined over-heat protection judgment threshold value and is equipped in the micro-controller 5 as a structural element realized as software as in the first and second embodiments. Also, a program installed in the micro-controller 5 can be realized by the same structure as that in the first embodiment, and therefore a flowchart of the program will be omitted.

Next, the operation will be described. The phase current detected by the A/D converting section 6 is compared with the predetermined over-current protection judgment threshold value, and its deviation is integrated in the integrating section 11. In this example, the deviations may be calculated and added for each of positive and negative in accordance with the flow directions, or the deviation between the absolute value and the above-mentioned threshold value may be added as in the above first embodiment. Hereinafter, the allowable limit values of the respective phase currents are gradually increased or decreased in accordance with the maximum value of the integrated value of the above-mentioned deviations and the characteristic, for example, shown in FIG. 4, to thereby limit the motor current.

If, as the above-mentioned over-heat protection judgment threshold value, a current value which can be, for example, driven continuously (hereinafter referred to as "continuous rated current") is set, a large current flows in a short period of time according to the short time rate of the motor 1 or the PWM inverter 4, and the motor current can be smoothly converged into the continuous rated current in accordance with the driving state.

While in this example the maximum current is gradually decreased on the basis of the integrated value of the deviation of the phase current and the predetermined over-heat protection threshold value, the maximum current may also be gradually increased or decreased on the basis of the integrated value of the deviation of the power function of the phase current and the predetermined over-heat protection threshold value.

Because the loss of the motor 1 or the PWM inverter 4 is substantially proportional to the current or the square of the current, a more appropriate over-heat protection can be performed.

Also, the same effect is obtained by adopting a construction in which the maximum current is gradually increased or decreased on the basis of the integrated value of the power function of the deviation between the phase current and the given over-heat protection threshold value.

As described above, according to the present invention, in the control device for the multi-phase motor, the motor current is limited in accordance with the integrated value of the predetermined function of the phase current, so that an appropriate over-heat protection is performed while changing the motor output characteristic smoothly with passage of time.

Also, since the peak value of the phase current is limited in accordance with the integrated value of the predetermined function of the phase current, over-heat protection is performed without involving a distortion of the sine wave motor current.

Further, since the motor current is limited in accordance with the maximum value of integrated values of the predetermined function of the respective phase currents, a phase which heated most can be protected without losing the balance of the three-phase of the motor current.

Further, since the d-axial current, the q-axial current, or the current obtained by vector-synthesizing the d-axial current and the q-axial current is limited in accordance with the integrated value of the predetermined function of the phase current, appropriate over-heat protection is performed even in the case where the multi-phase motor is vector-controlled.

Yet still further, since the phase angle formed by the q-axis and the current obtained by vector-synthesizing the d-axial current and the q-axial current is not changed before and after the motor current limit, the motor current can be limited while gradually reducing the rotating speed and the output torque in a well-balanced manner.

Yet still further, since the phase angle formed by the q-axis and the current obtained by vector-synthesizing the d-axial current and the q-axial current is changed before and after the motor current limit, and the d-axial current is allowed to flow in priority after the motor current is limited, as compared with the state in which the motor current is not limited yet, it is suitable when the rotating speed rather than the torque is given priority.

Yet still further, since the phase angle formed by the q-axis and the current obtained by vector-synthesizing the d-axial current and the q-axial current is changed before and after the motor current limit, and the q-axial current is allowed to flow in priority after the motor current is limited, as compared with the state in which the motor current is not limited yet, it is suitable when the torque rather than the rotating speed is given priority.

Yet still further, since the maximum value of the motor current is limited in motor current is limited quickly at the time of a large current and slowly at the time of a small current, whereby a more practical over-heat protection is performed.

Yet still further, since the maximum value of the motor current is limited in accordance with the integrated value of the deviation between the phase current and the predetermined threshold value, the motor current is limited quickly at the time of a large current and slowly at the time of a small current, whereby a more practical over-heat protection is performed.

Yet still further, since the maximum value of the motor current is limited in accordance with the integrated value of the deviation between the power function of the phase current and the given threshold value, the motor current is limited quickly at the time of a large current and slowly at the time of a small current, whereby a more practical over-heat protection is performed.

Yet still further, since the maximum value of the motor current is limited in accordance with the integrated value of the power function of the deviation between the phase current and the given threshold value, the motor current is limited quickly at the time of a large current and slowly at the time of a small current, whereby a more practical over-heat protection is performed.

Yet still further, since the power function is calculated in accordance with the polynomial approximation, the calculating amount can be reduced.

Yet still further, since the power function is calculated with reference to a table, the calculating amount can be reduced.

Yet still further, since the power function is independently calculated in the phase current flowing directions, the appropriate over-heat protection is conducted in accordance with the current flowing directions.

Yet still further, since the absolute value of the phase current, the calculating amount can be reduced.

Yet still further, since the power function is calculated in accordance with the detected value of the phase current, more appropriate over-heat protection is performed.

Yet still further, since the power function is calculated in accordance with the power function is calculated in accordance with the target value of the phase current, the present invention can also be applied to a motor control device not having a phase-current detecting circuit such as open-loop control.

The foregoing description of the p referred embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A motor control device for a multi-phase motor, comprising:
    a drive circuit for driving said multi-phase motor; and
    a micro-controller for controlling said drive circuit in accordance with a phase current of the motor; said micro-controller including
    a means for providing overheat protection, having:
        an integrating section for integrating a predetermined function of the phase current of the motor with respect to each phase, to obtain an integrated value of the predetermined function of each phase current of the motor which acts as an index of power consumption; and
        a motor current limit value calculating section for providing a motor current limit value based on the integrated value of the predetermined function of each phase current of the motor from the integrating section;
        wherein the motor current limit value obtained by the motor current limit value calculating section gradually decreases a peak value of a sine wave motor current.

2. The motor control device as claimed in claim 1, wherein said micro-controller limits a peak value of the phase current in accordance with an integrated value of a predetermined function of a phase current.

3. The motor control device as claimed in claim 1, wherein said micro-controller limits the motor current in accordance with a maximum value of the given functional integrated values of the respective phase currents.

4. The motor control device as claimed in claim 1, wherein said micro-controller limits a d-axial current in accordance with an integrated value of a predetermined function of a phase current.

5. The motor control device as claimed in claim 1, wherein said micro-controller limits a q-axial current in accordance with an integrated value of a predetermined function of a phase current.

6. The motor control device as claimed in claim 1, wherein said micro-controller limits a current obtained by vector-synthesizing a d-axial current and a q-axial current in accordance with an integrated value of a predetermined function of a phase current.

7. The motor control device as claimed in claim 1, wherein said micro-controller does not change a phase angle formed by the q-axis and the current obtained by vector-synthesizing the d-axial current and the q-axial current before and after the motor current is limited.

8. The motor control device as claimed in claim 1, wherein said micro-controller changes the phase angle formed by the q-axis and the current obtained by vector-synthesizing the d-axial current and the q-axial current before and after the motor current is limited.

9. The motor control device as claimed in claim 8, wherein, after the motor current is limited, said micro-controller changes the phase angle formed by the q-axis and the current obtained by vector-synthesizing the d-axial current and the q-axial current so as to allow the d-axial current to flow in priority as compared with the state in which the motor current is not limited yet.

10. The motor control device as claimed in claim 8, wherein, after the motor current is limited, said micro-controller changes the phase angle formed by the q-axis and the current obtained by vector-synthesizing the d-axial current and the q-axial current so as to allow the q-axial current to flow in priority as compared with the state in which the motor current is not limited yet.

11. The motor control device as claimed in claim 1, wherein said micro-controller limits the motor current in accordance with an integrated value of a power function of the phase current.

12. The motor control device as claimed in claim 1, wherein said micro-controller limits the motor current in accordance with the integrated value of a deviation between the phase current and a predetermined threshold value.

13. The motor control device as claimed in claim 1, wherein said micro-controller limits the motor current in accordance with the integrated value of a deviation between the power function of the phase current and a predetermined threshold value.

14. The motor control device as claimed in claim 1, wherein said micro-controller limits the motor current in accordance with an integrated value of the power function of a deviation between the phase current and a predetermined threshold value.

15. The motor control device as claimed in claim 11, wherein said micro-controller calculates the power function through polynomial approximation.

16. The motor control device as claimed in claim 11, wherein said micro-controller calculates the power function with reference to a table.

17. The motor control device as claimed in claim 1, wherein said micro-controller independently conducts the calculation in accordance with the phase current flowing direction.

18. The motor control device as claimed in claim 1, wherein said micro-controller conducts the calculation in accordance with an absolute value of the phase current.

19. The motor control device as claimed in claim 1, wherein said micro-controller conducts the calculation in accordance with a detected value of the phase current.

20. The motor control device as claimed in claim 1, wherein said micro-controller conducts the calculation in accordance with the target value of the phase current.

* * * * *